United States Patent
B.

(10) Patent No.: US 6,322,853 B1
(45) Date of Patent: Nov. 27, 2001

(54) PROCESS AND PRODUCT FOR RENDERING A SUBSTANCE FLAME RESISTANT

(75) Inventor: Ricardo Cuevas B., Grupo Administrativo Cuevas, S.A. de C.V., Periferico Sur 4349-40 (MX)

(73) Assignees: Ricardo Cuevas B.; German Cuevas B.; John Rennie Rogers, all of (MX)

(*) Notice: Subject to any disclaimer, the term of this patent is extended or adjusted under 35 U.S.C. 154(b) by 0 days.

(21) Appl. No.: 09/543,243

(22) Filed: Apr. 5, 2000

Related U.S. Application Data

(62) Division of application No. 09/345,553, filed on Jun. 30, 1999, now Pat. No. 6,066,198, which is a division of application No. 09/049,745, filed on Mar. 27, 1998, now Pat. No. 5,948,148.

(51) Int. Cl.[7] ............................. B05D 1/02; B05D 3/02; B05D 3/12
(52) U.S. Cl. .................. 427/350; 427/372.2; 427/384; 427/421; 427/427; 427/430.1
(58) Field of Search ................ 427/350, 372.2, 427/384, 421, 427, 430.1

(56) References Cited

U.S. PATENT DOCUMENTS

| | | |
|---|---|---|
| Re. 29,630 | 5/1978 | May . |
| 2,530,261 * | 11/1950 | Morton et al. ................ 8/116.2 |
| 3,607,341 | 9/1971 | Goins et al. . |
| 3,763,497 | 10/1973 | Leach . |
| 3,775,165 | 11/1973 | Young et al. . |
| 3,859,124 | 1/1975 | Thompson . |
| 3,891,727 | 6/1975 | Weil . |
| 3,919,439 | 11/1975 | Perkins et al. . |
| 3,934,285 | 1/1976 | May . |
| 4,092,251 | 5/1978 | Smith . |
| 4,602,081 | 7/1986 | Mikroyannidis et al. . |
| 4,663,226 | 5/1987 | Vajs et al. . |
| 5,156,775 | 10/1992 | Blount . |
| 5,358,780 | 10/1994 | Kafchinski et al. . |
| 5,679,277 | 10/1997 | Niibe et al. . |
| 5,948,148 | 9/1999 | Cuevas B. ................ 106/18.13 |
| 6,066,198 | 5/2000 | Cuevas B. ................ 106/18.12 |

FOREIGN PATENT DOCUMENTS

| | | |
|---|---|---|
| 1582658 * | 10/1969 | (FR) . |
| 49-023277 | 6/1974 | (JP) . |
| 51-052699 | 5/1976 | (JP) . |
| 8602114 | 3/1986 | (WO) . |

OTHER PUBLICATIONS

Shafizadeh, et al., Fire Retardant Chem. (1975), 2 (3, Suppl.), pp. 195–203.

* cited by examiner

Primary Examiner—Erma Cameron
(74) Attorney, Agent, or Firm—Lee, Mann, Smith, McWilliams, Sweeney & Ohlson

(57) ABSTRACT

A process and product for increasing the flame resistance and thermal insulation properties of chemically treated substances, in some cases providing the treated substance with flame resistance at temperatures higher than 1800° C. (direct fire), with no limit to the time of exposure. A number of embodiments of flame resistant compositions are discussed herein but all embodiments include a mixture containing water, inorganic acids, ammonium salts, sodium carbonate and pyrophosphate and, in some instances other constituents. The disclosed process treats substances to prevent the generation of any flames. The substances that have successfully been tested with the disclosed process include cloth (natural and synthetic), rugs and carpets, wood, cardboard, and paper. However, it is believed that this process can be applied to an unlimited number of flammable cellulose substances. With respect to the treatment of cloth, another advantage asserted for the disclosed process is that the texture and colors of the treated cloth are minimally affected, if at all. The cloth will not look or feel hard, thick or tough. Furthermore, the chemical treatment of the cloth will last through six months of domestic washing. A further application of the disclosed invention is as a coating on foam, particularly polyurethane foam and laminated foam. Applying the disclosed invention to foam material results in a resistance to all fire, not just an impedance to the flame for a limited period of time as known in the prior art. An even further application of the disclosed invention is as an additive to paint, resulting in an increase in the paint's tolerance to fire. This increase in thermal resistance would necessarily be transferred to any articles coated with said paint.

11 Claims, No Drawings

PROCESS AND PRODUCT FOR RENDERING A SUBSTANCE FLAME RESISTANT

This is a division of application Ser. No. 09/345,553, filed Jun. 30, 1999, now U.S. Pat. No. 6,066,198 which is a division of application Ser. No. 09/049,745, filed Mar. 27, 1998, now U.S. Pat. No. 5,948,148.

BACKGROUND OF THE INVENTION

This invention relates to a flame resistant composition, a process for producing it, as well as flame resistant articles treated by such composition. More particularly, it relates to the treating of fabric, rugs, carpets, etc., as well as other non-textile flammable articles such as cardboard, paper, wood, etc., with a composition to make the article flame retardant. This flame resistant composition could also be added to paint to increase the thermal resistant properties of the paint and any articles coated by the paint.

Polymeric materials such as acrylics, reactive acrylics, vinyl chloride homopolymers and copolymers, styrene-butadiene copolymers, vinylidene chloride, vinyl acetate homopolymers and copolymers and styrene-butadiene-acrylonitrile terpolymers have been employed in the textile industry in the production of coated fabrics to furnish said fabrics with a coated backing. In accordance with conventional methods now in use, a drapery or other fabric or substrate is treated with a liquid emulsion of a polymeric material and then the treated fabric is cured and dried. However, such resultant coated fabrics have a number of limitations and deficiencies. For example, heretofore conventional polymeric coatings produced by the above method have exhibited disadvantages such as having a tendency to unduly penetrate or strike through the fabric, causing a stiffening or hardening of the coated fabric, and may fail to provide a complete uniform backing. Fabric coatings lacking such uniform opaqueness provide only a poor barrier against sunlight, thereby subjecting the fabric to eventual color and strength degradation and are poor insulators against weather elements. In order to overcome these deficiencies, conventional polymeric formulations may have to be coated onto the fabrics or other substrate in high weight amounts to insure opaqueness. Such high weight coatings may result in bulky fabrics that are objectionably stiff and unduly expensive.

The above mentioned disadvantages maybe readily and easily overcome by the disclosed unique and advantageous method of treating a fabric or other flammable non-textile articles, such as wood, paper, cardboard, etc. to make the article flame resistant. The present invention provides an improved treated fabric which is relatively soft and pliable as well as having good thermal insulation, good resistance to deterioration from aging or abrasion, and good resistance to repeated washing and dry cleaning operations. Furthermore, the chemically treated cloth (natural and synthetic) possesses flame resistance at temperatures higher than 1800° C. and the ability to thermally insulate against the transmission of heat. Other objects and advantages of the instant invention will be readily apparent from the following description and appended claims.

SUMMARY OF THE INVENTION

The disclosed invention increases the flame resistance and thermal insulation properties of chemically treated substances, in some cases providing the treated substance with flame resistance at temperatures higher than 1800° C. (direct fire), with no limit to the time of exposure. The prior art products of this type are generally known as "flame retardants" that have a maximum tolerance of 15 seconds after 170° C., after which they allow for the generation of flames and burning. The disclosed process chemically treats substances to prevent the generation of any flames. The substances that have successfully been tested after being treated with the disclosed process include cloth (natural and synthetic), rugs and carpets, wood, cardboard, and paper. However, it is believed that this process can be applied to an unlimited number of flammable cellulose substances.

With respect to the treatment of cloth, another advantage asserted for the disclosed process is that the texture and colors of the treated cloth are minimally affected, if at all. Furthermore, the chemical treatment of the cloth will last through six months of domestic washing.

A further application of the disclosed invention is as a coating on foam, particularly polyurethane foam and laminated foam. It is well known in the automotive industry to provide foam material that is "flame retardant." However, applying the disclosed invention to foam material results in a resistance to all fire, not just an impedance to the flame for a limited period of time as known in the prior art.

An even further application of the disclosed invention is as an additive to paint, resulting in an increase in the paint's tolerance to fire. This increase in thermal resistance would necessarily be transferred to any articles coated with said paint.

A number of embodiments of flame resistant compositions are discussed herein but all embodiments include a mixture containing water, inorganic acids, ammonium salts, sodium carbonate and pyrophosphate and, in some instances, other constituents.

DETAILED DESCRIPTION OF THE PREFERRED EMBODIMENT

The present invention is directed to a process and product for rendering an article flame resistant by treating the previously flammable substance with a chemical formula (hereinafter referred to as "Formula A"). The disclosed application of Formula A to an article increases it's flame resistance.

A preferred embodiment of Formula A is presented below, in weight percent and will be referred to hereafter as Formula A1:

68% water
17% phosphoric acid
3% boric acid
9% ammonium salts
2% sodium carbonate
1% pyrophosphate Although this is the preferred composition, it is known that phosphoric acid ($H_3PO_4$) could be replaced by disodic phosphate ($Na_2HPO_4$), monosodic phosphate ($NaHPO_4$) or sulfamic acid ($H_2NSO_3H$) in equal weight percents. In addition, although not preferred, the ammonium sulfate could be replaced by ammonium chlorate ($NH_4ClO_3$) in equal weight percents.

To prepare one kilogram of Formula A1, the preferred method begins with mixing about 29.35 ml. of water ($H_2O$) with about 20.97 grams of phosphoric acid ($H_3PO_4$). Next, you add about 12.58 grams of ammonium sulfate (($NH_4)_2SO_4$), followed by the addition of about 4.2 grams of boric acid ($H_3BO_3$). The next step is to slowly add about 1.36 grams of sodium carbonate ($Na_2CO_3$). An additional 14.6 ml. of water ($H_2O$) is then added, followed by the addition of about 1.36 grams of sodium carbonate ($Na_2CO_3$). Next, about 0.83 grams of pyrophosphate ($H_4O_7P_2$) is added to the mixture. Finally, another 14.75 ml. of water ($H_2O$) is added, to complete the mixture. It is necessary to mix the resultant composition until all of the chemical contents are dissolved within the water. The composition is then left at rest for approximately 15 minutes, and then strained to remove any impurities.

It is also known that for some applications phosphoric acid can be eliminated from the chemical mixture for Formula A1 with a resultant increase in the weight percent of boric acid. The resultant product (Formula A2) has the same fire resistant properties of the preferred embodiment, and is presented below in weight percent:

68% water
20% boric acid
9% ammonium salts
2% sodium carbonate
1% pyrophosphate

Boric acid can also be replaced entirely by phosphoric acid in Formula A1, with the resultant treating solution (Formula A3) still have the same fire resistant properties. The formula for this third embodiment (Formula A3) is presented below:

68% water
20% phosphoric acid
9% ammonium salts
2% sodium carbonate
1% pyrophosphate

Application to Cloth

The application of the disclosed invention to cloth (natural and synthetic) causes the chemically treated cloth to be flame resistant at temperatures higher than 1800° C. (direct fire), with no limit to the time of exposure. The treated cloth prevents the generation of any flames and acts as a thermal insulation. An important advantage that the disclosed process has over the prior art is that the texture and colors of the treated cloth or any articles made therefrom are minimally affected if at all. Furthermore, the chemical treatment of the cloth will last through six months of washing.

The process for treating cloth consists of two main steps: (1) the application of Formula A to the cloth, and (2) the application of a second chemical solution (hereinafter referred to as Formula B) to promote the adhesion of Formula A to the cloth. This allows the treated cloth to retain its fire resistant characteristics through repeated domestic washing. The preferred embodiment of Formula B, in weight percent, is:

32.5% water
52% copolymers of acrylic vinyl
0.5% linker emulsion
15% silicone rubber latex The overall seven-step process for treating cloth to render the cloth flame resistant is described below:

1) Application of Formula A to cloth, either by spraying it on or by immersing the cloth into the solution, and pressing out any residue through the use of rollers;
2) Application of Formula B to the cloth, which allows for Formula A to remain permanently on the cloth and increase the duration of its effectiveness;
3) Elimination of humidity through the generation of turbulent air;
4) Adhesion of the chemical solutions of Formula A and B to the fibers through the use of heat;
5) Washing of the cloth by immersing it in water,
6) Shrinking the cloth through the use of rollers; and
7) Using heat to dry the cloth.

An alternative method for treating cloth with the disclosed invention is to combine Formulas A and B before application to the cloth, thus applying an integrated chemical solution (hereinafter referred to as Formula C) to the cloth in one main step, instead of two separate ones. Thus, the overall process would be six steps instead of seven, with the first two steps being consolidated into one. The preferred embodiment of Formula C, in weight percent, is:

47% water
13% phosphoric acid
1% boric acid
7% ammonium salts
1.5% sodium carbonate
1% pyrophosphate
24% copolymers of acrylic vinyl
0.5% linker emulsion
5% silicone rubber latex Tests were conducted on several different kinds of cloth treated with the disclosed process, including cotton, polyester and cotton/polyester blends. Application of direct fire to the cotton cloth resulted in carbonization, without turning into ashes. Application of direct fire to the polyester materials caused the polyester to become perforated by the combustion of the plastic. In both instances, neither treated cloth allowed the generation of any flames.

Application to Rugs and Carpets

Tests revealed that rugs and carpets could also be made flame resistant by spraying Formula A directly on the fiber material. The treated fibers became resistant to fire, and remained resistant to direct fire for over two minutes without generating any flame. Gasoline was even added to the treated fibers and set on fire. The gas was burned until consumption without propagation of fire to the treated fibers.

Application to Cardboard

The application of Formula C directly to cardboard results in the cardboard becoming resistant to fire, and also provides protection against humidity. Another possible method is to apply a mixture of 75 weight percent Formula A, with 25 weight percent latex to both sides of the cardboard. This resultant product is treated cardboard that is protected from both fire and humidity.

For best results, the chemical solution should be directly sprayed onto the cardboard, perhaps with the use of an industrial compressor. An alternate method is immersion of the cardboard within the solution. However, it is important that the cardboard not become soaked through Tests revealed that the treated cardboard resisted direct fire for more than two minutes without allowing any flames to generate.

Application to Wood

Various tests revealed that wood could also be treated with the disclosed invention, providing the wood with the same fire resistant characteristics as the previously named substances. The preferred embodiment of the treating solution, in weight percent, is: 90% Formula A mixed with 10% epoxic resin. The addition of epoxic resin to Formula A allows the resultant mixture to lubricate the wood and maintain the wood's natural characteristics. Tests discovered that use of Formula A alone could cause the wood to dehydrate.

The method of application to the wood plays an important role in determining the extent of resistance the wood will have to fire. Tests performed on the wood showed that spraying the wood with Formula A resulted in only topical protection against fire, which limited its protection to a flame retardant with low resistance. Further testing revealed that total immersion and soaking of the wood for a period not shorter than ten minutes, followed by 48 hours of drying, increased the wood's tolerance to fire. The treated wood had a high resistance as a flame retardant, even after the application of direct fire via a blowtorch for over ten minutes.

Finally, testing showed that application of Formula A to wood via a vacuum, or alternatively an autoclave, allowed the chemical to penetrate directly into the heart of the wood. The end result was that the treated wood was completely resistant to flame. The treated wood self-extinguished any blaze, even after the application of a blowtorch for more than ten minutes.

Another advantage of treating the wood with the disclosed invention, besides obtaining wood that is highly resistant to direct fire, is that the application of the treating solution prevents the generation of mushrooms and germs that occur naturally within the environment and that are known to damage wood.

Application to Polyurethane Foam and Laminated Foam

Foam that is presently being used in the automotive industry is advertised as "flame retardant." However, tests revealed that the application of a blowtorch to this foam resulted in the generation of flame in less than one minute. In comparison, spraying the identical foam material with Formula A, preferably with an industrial compressor, significantly increased the foam's resistance to fire.

Application as an Additive to Paint

The disclosed invention can also be used as an additive to any kind of vinyl or acrylic paint, to increase the paint's tolerance to fire and necessarily transfer that increase in flame resistance to articles coated with the treated paint. The process for treating paint consists of two steps:

1) Mixing 75 weight percent Formula A with 25 weight percent vinyl balance resin to create a paint additive; and
2) Mixing 25 weight percent of the resultant paint additive with 75 weight percent vinyl or acrylic paint.

In addition to increasing the paint's thermal tolerances, the addition of a natural raw mineral, such as pearlite, would also increase the paint's insulating properties. The preferred method of increasing the paint's thermal and insulative properties is:

1) Mixing 75 weight percent Formula A with 25 weight percent vinyl balance resin to create a paint additive;

2) Mixing 70–90 weight percent of the resultant additive with 10–30 weight percent of pearlite; and
3) mixing 20 weight percent of the resultant product from step 2 with 80 weight percent vinyl or acrylic paint.

Various features of the invention have been particularly shown and described. However, it must be understood that these particular arrangements do not limit but merely illustrate, and that the invention is to be given its fullest interpretation within the terms of the appended claims.

What is claimed is:

1. A process for treatment of articles to render them flame resistant including the steps of:

preparing a nonflammable liquid by mixing, by weight percent:
        from about 60 to about 93% of water ($H_2O$);
        from about 1.7 to about 25% inorganic acids;
        from about 0.5 to about 10% ammonium salts;
        from about 0.5 to about 2% sodium carbonate ($Na_2CO_3$); and
        about 1% pyrophosphate ($H_4O_7P_2$); and
    applying said nonflammable liquid to the article.

2. A process in accordance with claim 1 further including the step of preparing said inorganic acids by mixing, by weight percent:

from about 68 to about 99% phosphoric acid ($H_3PO_4$); and
    from about 1 to about 32% boric acid ($H_3BO_3$).

3. A process in accordance with claim 1 further including the step of preparing said inorganic acids by providing about 100 weight % boric acid ($H_3BO_3$).

4. A process in accordance with claim 1 further including the step of preparing said inorganic acids by providing about 100 weight % phosphoric acid ($H_3PO_4$).

5. A process in accordance with claim 1 further including the step of preparing said ammonium salts by providing 100 weight % ammonium sulfate (($NH_4$)$_2SO_4$).

6. A process in accordance with claim 1 further including the step of spraying said nonflammable liquid onto the article.

7. A process in accordance with claim 1 further including the step of immersing the article within said nonflammable liquid.

8. A process in accordance with claim 1 further including the steps of preparing a nonflammable mixture by mixing, by weight percent:

about 90% of said nonflammable liquid; and
    about 10% epoxy resin; and
    applying said mixture to the article.

9. A process in accordance with claim 8 further including the step of immersing the article in said mixture.

10. A process in accordance with claim 8 further including the step of using an autoclave to apply said mixture to the article.

11. A process in accordance with claim 8 further including the step of applying said mixture to the article in a vacuum.

* * * * *